(12) United States Patent
Pinter et al.

(10) Patent No.: US 8,009,568 B2
(45) Date of Patent: Aug. 30, 2011

(54) CONGESTION CONTROL IN STATELESS DOMAINS

(75) Inventors: Ferenc Pinter, Budapest (HU); Attila Bader, Paty (HU); Andras Csaszar, Budapest (HU); Attila Takacs, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 5 days.

(21) Appl. No.: 12/514,016

(22) PCT Filed: Nov. 9, 2006

(86) PCT No.: PCT/EP2006/068317
§ 371 (c)(1),
(2), (4) Date: Mar. 29, 2010

(87) PCT Pub. No.: WO2008/055548
PCT Pub. Date: May 15, 2008

(65) Prior Publication Data
US 2010/0182907 A1    Jul. 22, 2010

(51) Int. Cl.
*G01R 31/08* (2006.01)
(52) U.S. Cl. ......................... 370/235; 370/231
(58) Field of Classification Search .................. 370/229, 370/235–238, 252–253, 400–410; 709/235
See application file for complete search history.

(56) References Cited

U.S. PATENT DOCUMENTS

| | | | | |
|---|---|---|---|---|
| 6,839,321 | B1 * | 1/2005 | Chiruvolu | 370/230.1 |
| 7,450,526 | B2 * | 11/2008 | Yang | 370/255 |

FOREIGN PATENT DOCUMENTS

| | | |
|---|---|---|
| EP | 0 955 749 A | 11/1999 |
| WO | WO 2006/052174 A | 5/2006 |

* cited by examiner

*Primary Examiner* — Pao Sinkantarakorn
*Assistant Examiner* — Iqbal Zaidi (57) ABSTRACT

Reducing congestion in an IP domain wherein congested data flows arriving at an egress edge node of the network are identified. Total congestion represented by the congested flows is determined, and a congestion extent notification is sent from the egress edge node to its ingress edge node peer. The congestion extent notification includes information regarding the total congestion and is sent on a per-class basis. Congested core routers in the network insert DSCPs into data packets passing through them to enable the egress edge nodes to identify the affected flows. The core routers may also send congestion metric messages, designed to follow the same path as the marked packets, to inform the egress edge nodes of the extent of congestion. In an alternative method, the egress edge nodes inform their ingress peers that congestion is present, without initially identifying the extent. The ingress edge node sends a query downstream with a congestion metric.

16 Claims, 3 Drawing Sheets

CONGESTION CONTROL IN STATELESS DOMAINS

FIELD OF THE INVENTION

The present invention relates to congestion control in stateless domains. In particular, the invention relates to a system for dealing with congestion in networks caused by failure of a core node.

BACKGROUND TO THE INVENTION

In IP networks, resource management protocols on the data path have been investigated in recent years to ensure quality of service (QoS). Such protocols are responsible for ensuring that resource needs are met for data flows arriving at the edge of a network domain or autonomous system, and to ensure that the interior nodes of the domain are provided with information regarding the future path of the flow. This enables the interior nodes to make a local admission control decision. A flow is usually admitted into a network domain only if all interior nodes in the path have admitted it. A flow is admitted end-to-end only if all intermediate domains have made a positive admission decision. The admission of a flow also requires the reservation of resources in all interior nodes (except for pure measurement based admission control).

Integrated Services (IntServ) is one architecture adopted to ensure QoS for real-time and non real-time traffic in the Internet. The Internet Engineering Task Force (IETF) standardization organization has specified the Resource ReSerVation Protocol (RSVP) for reserving resources in IP routers, as specified in RFC 2205. Each router along the data path stores "per flow" reservation states. The reservation states are "soft" states, which have to be refreshed by sending periodic refresh messages. If a reserved state is not refreshed, the state and the corresponding resources are removed after a time-out period. Reservations can also be removed by explicit tear down messages. RSVP messages always follow the data path, and so RSVP can operate alongside standard routing protocols. If traffic is re-routed, refresh messages make reservations in the new data path.

In large networks the number of flows, and therefore the number of reservation states, is high. This can lead to problems storing and maintaining per-flow states in each router. Another architecture, Differentiated Services (DiffServ), has therefore been proposed to provide QoS in large-scale networks, and this is described in RFC 2475. In the DiffServ architecture, services are offered on an aggregate, rather than per-flow basis, in order to allow scaling up to larger networks. As much of the per-flow state as possible is forced to the edges of the network, and different services are offered for these aggregates in routers.

The service differentiation is achieved using the Differentiated Services (DS) field in the IP header. Packets are classified into Per-Hop Behaviour (PHB) groups at the edge nodes of the DiffServ network. Packets are handled in DiffServ routers according to the PHB indicated by the DS field in the message header. The DiffServ architecture does not provide any means for devices outside the domain to dynamically reserve resources or receive indications of network resource availability. In practice, service providers rely on subscription-time Service Level Agreements (SLAs) that statically define the parameters of the traffic that will be accepted from a customer.

The IETF Next Steps In Signaling (NSIS) Working Group is currently working on a protocol to meet new signalling requirements of today's IP networks. The QoS signaling application protocol of NSIS is fundamentally similar to RSVP, but has several new features, one of which is the support of different QoS Models. One of the QoS models under specification is Resource Management in DiffServ (RMD). RMD defines scalable admission and congestion control methods for DiffServ networks, so that interior nodes inside a domain possess aggregated states rather than per-flow state information. For example, interior nodes may know the aggregated reserved bandwidth, rather than each flow's individual reservation. RMD also uses soft states (as with RSVP), and explicit release of resources is also possible.

The "stateless" domain property means that, in the domain, the interior nodes do not maintain per-flow state information, only aggregated states (e.g., per-class). However, even in stateless domains, the ingress and egress edges are stateful nodes. In RMD, an end-to-end reservation is divided into "per-domain" reservation (between stateful edge nodes) and "per-hop" reservation (local reservation inside the domain).

All practical resource reservation protocols (RSVP/NSIS/RMD) rely on the routing protocols to assign a path for the incoming flow. The protocol message is routed along the same path as will be used by the regular user packets after a positive admission decision, which is why the reservation along this path is valid. However, the opposite relationship is generally not true: internal routing protocols (e.g. Open Shortest Path first (OSPF), Intermediate System to Intermediate System (IS-IS) or Border Gateway Protocol (BGP)) do not rely on the reservation protocol when determining the paths.

Thus, when an existing link or node fails, the routing protocols calculate a new path based on their own optimization criteria and own metrics (e.g. choosing the lowest cost path) without recourse to the reservation protocols. As a result, traffic may easily be re-routed to a path that is already occupied (i.e., where there was no reservation for the re-routed flows) leading to severe congestion.

Figure 1:
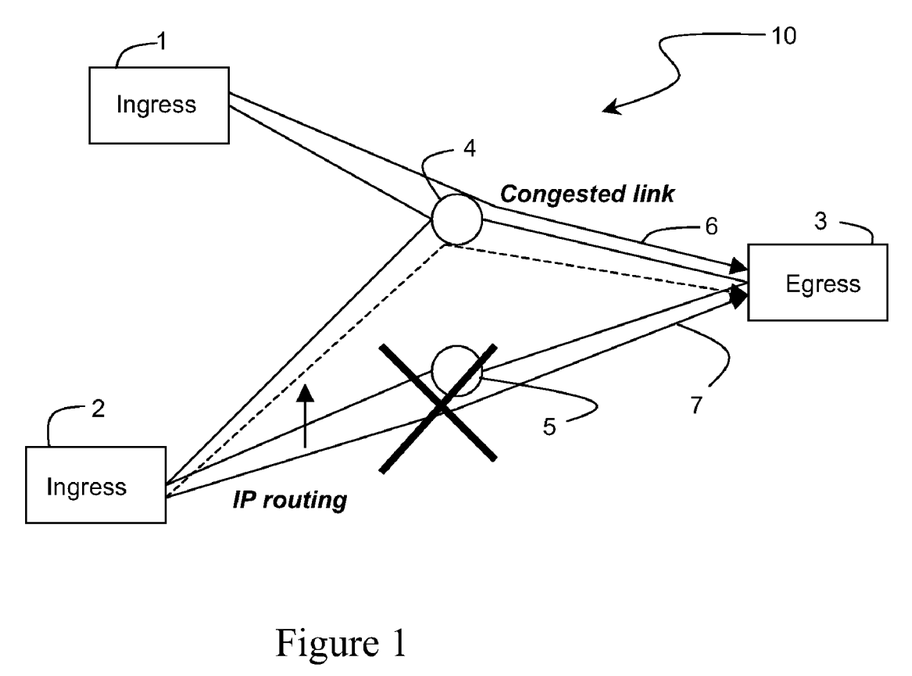
FIG. 1 is a schematic representation of an IP DiffServ domain suffering from congestion.

FIG. 1 illustrates how congestion may occur when a flow is re-routed. An exemplary IP DiffServ domain 10 has two ingress edge nodes 1, 2, one egress edge node 3, and two core routers 4, 5. One data flow 6 passes from one of the ingress nodes 1, via one of the routers 4, to the egress node 3. Another data flow passes from the other ingress node 2, via the other router 5, to the egress node 3. If the second router 5 fails, the second data flow 7 is re-routed via the first router 4. Since the first router 4 is already handling the first data flow 6, this causes congestion in that router.

The resource management protocol must quickly remove the potential congestion and re-establish the reservations of the re-routed flows on the new path. Where all interior nodes include per-flow reservation states (as in RSVP), the interior node that re-routes the traffic can re-initialize the reservations of the re-routed flows quickly after the path change. In the case of RSVP, this is called Local Repair. Local Repair starts in the node that re-routes the traffic: this node—utilising its per-flow database—sends out reservation messages for all re-routed flows onto the new path, immediately trying to reserve their bandwidth. If the reservation is not successful, the excess flows are terminated.

Figure 2:
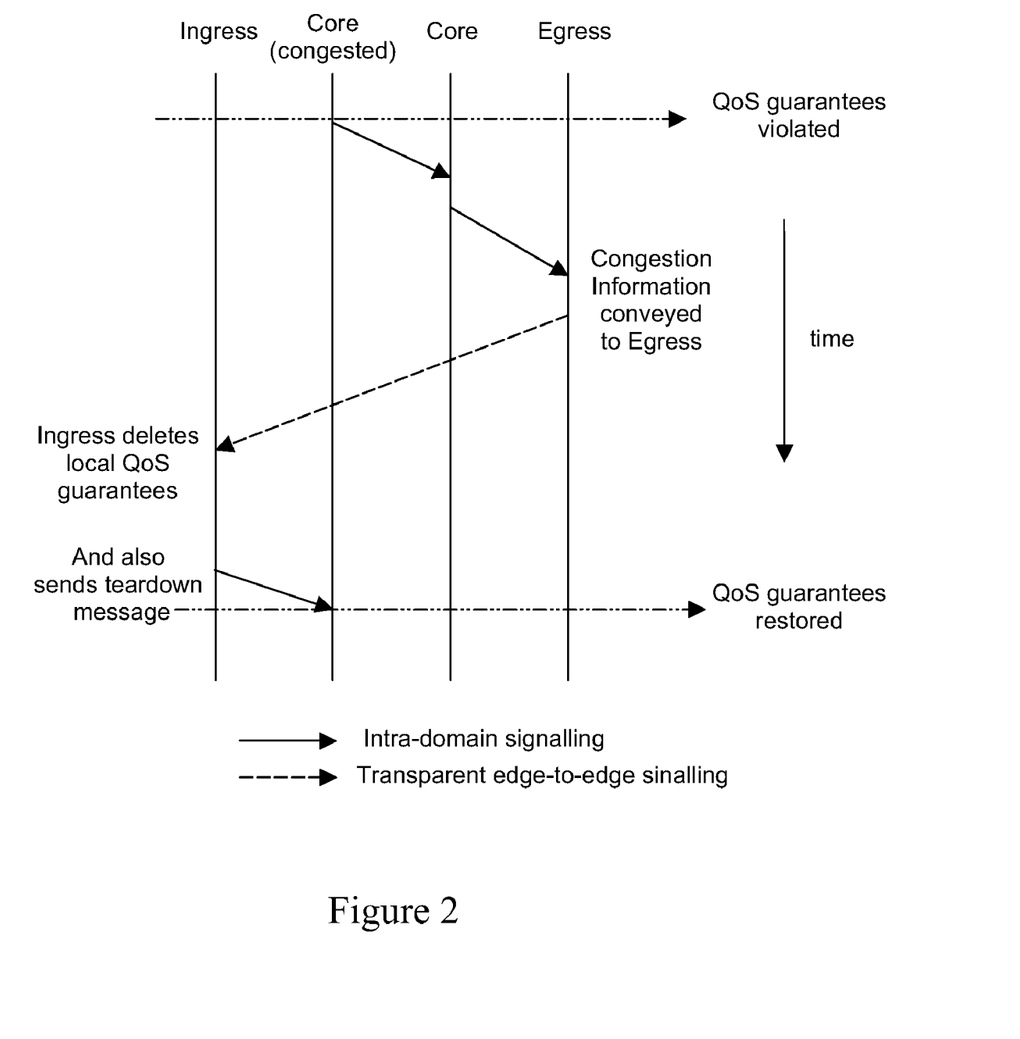
FIG. 2 illustrates the signalling required to remove congestion in an IP DiffServ domain.

However, with a reduced-state protocol (e.g. RMD), the solution for these congestion situations is non-trivial, since session data is only available at the edge nodes of the domain. Interior nodes can report the overload to the egress edge nodes using packet marking, but cannot re-establish the reservation states. When egress nodes receive information describing the congestion, they must inform their stateful ingress peers by sending notification messages upstream. The ingress nodes can then choose from alternative solutions to solve the situation, since they are the ultimate sources of QoS guarantees in the domain. Possible solutions could include pre-configured combinations of methods such as admission denial for new flows, or deletion of QoS guarantees for congested or low priority flows. The signalling procedures required to put this into operation are shown in FIG. 2.

All congestion handling approaches in stateless QoS domains must transmit two pieces of information to egress:
1. The identification of flows, to any given egress node, which are affected by the congestion. This enables egress to make decisions about the flows for which the reservations can be torn down.
2. The metric of congestion (i.e. the excess bandwidth that cannot be supported long term).

In current specifications, the first requirement (identifying affected flows) is solved by ensuring that all data packets that pass a congested core node are marked with a pre-allocated packet classification field in the header of the packet, known as a Differentiated Service Code Point (DSCP). The DSCP used in this case is called AFFECTED DSCP. Where an egress node receives packets for its flows through many core nodes, not all of which are congested, the AFFECTED DSCP enables the identification of the flows which add to the overload, using per-flow Type of Service (TOS) field sensitive flags.

One method to ensure that the second requirement (conveying the congestion metric to the egress nodes) is met is to re-mark data packets with an indicator of the excess bandwidth value. This can be done using another pre-allocated DSCP called ENCODED DSCP. This encoding process might be a byte-to-byte correspondence between excess bandwidth and marked bandwidth, or there might be a pre-configured domain-wide multiplier, so that one ENCODED DSCP-marked packet received at an egress node identifies more overload bandwidth than its actual packet size.

Thus packets marked with both AFFECTED and ENCODED DSCPs can be distinguished from other traffic, and can be measured at egress nodes. When multiple congestions are solved using this model, every core node must measure enter the rate of data entering the node, together with the rate of data marked by the AFFECTED DSCP entering the node, on a per-egress interface basis. By these measurements, it is possible to re-mark packets with the appropriate overload level, no matter if the current core node drops packages or not.

There are a number of problems with the method described above for solving congestion.

One problem relates to the processing overhead required for per-flow congestion notifications. Using the method described, egress nodes instruct their ingress peers to delete reservations for individual flows on a per-flow basis. If the number of these flows is large (e.g. several hundreds), then the bursts of API calls between the signalling and transport layers can cause delay in upstream congestion advertising. Furthermore, when these messages reach their destination ingress node, they generate processing overhead. The signalling messages load the already congested network with extra traffic, and might be dropped if they do not have dedicated bandwidth. This drop results in an inaccurate solution.

Another problem relates to the transmission of a congestion metric based on the re-marking of the TOS field. The concept is accurate, but demanding if used generally to support multiple congested core nodes on the downstream path. Two extra DSCP-s are required for each PHB classification, to distinguish between packets passing the congested core node (which are re-marked with AFFECTED DSCP), and packets used in the metric encoding process (re-marked with ENCODED DSCP). Thus ten or more extra DSCP-s may be required, which will be used only for congestion handling in the stateless domain.

The method described above provides for signalling a high volume of overload (that is higher than the capacity) quickly, by specifying a multiplier, so that each received byte in marked packets identifies more than one byte of congested bandwidth. However, this multiplier must be configured domain-wide, and real-time consistent changes in all nodes might be a problem. Furthermore, congestion handling granularity drops as the multiplier is increased. Moreover, because marked packets are given the same or worse QoS guarantees than normal data-packets, marked packets may also be dropped, and due to the effect of the multiplier, each lost packet means that [packet size]×[multiplier] bytes of congestion bandwidth stays unhandled.

In addition, the egress nodes must measure the marked bytes, which means that they also have to measure the size of every passing packet. This method has its implementation difficulties as well, and the result depends on the correctness of the measurements.

Another problem relates to the transmission of the congestion metric based on refreshing reserve messages. Refreshing reserve messages are sent between stateful ingress and egress peers in an RMD domain, in an edge-to-edge manner, so transmission of this message is transparent to the core routers. However, as specified in the NSIS RMD draft, intra-domain core nodes are also signalled for, though with higher frequency. Numbers suggested by the draft are 30 seconds for edge-to-edge refreshes, and about 10 seconds for intra-domain refresh messages.

These refresh-times are domain-wide, pre-configured values. This can lead to problems in a link where admitted flow count (flows which have active reservations on their signaling path) is low (e.g. one or two) and a congestion event takes place when the re-routed flow count is also low. In this situation, refresh messages are only able to transmit the congestion metric in tens of seconds, which results in large congestion handling times.

It would therefore be desirable to solve congestion events faster than is possible using the systems described above.

STATEMENT OF THE INVENTION

In accordance with one aspect of the present invention there is provided a method of reducing congestion in an IP network, comprising:
identifying congested data flows, which have passed through congested core routers within the network, arriving at an egress edge node of the network;
determining an aggregate congestion represented by the congested flows; and
sending a congestion extent notification from the egress edge node to an ingress edge node of the network, the congestion extent notification providing information regarding the aggregate congestion to the ingress edge node.

Thus the egress node sends an aggregate notification to the ingress edge node which can provide information for many data flows, rather than sending one notification per flow. This means that the transport layer no longer needs to handle large bursts of edge-to-edge transmissions, since it only needs to process one message. Furthermore, message processing (and thus congestion handling) time at the ingress edge node is reduced.

The congestion extent notification may indicate to the ingress edge node a congestion-clearing bandwidth which must be freed to remove the congestion caused by flows passing through that ingress edge node. The ingress edge node preferably terminates sufficient data flows to free the congestion-clearing bandwidth. The congestion extent notification may identify a Per Hop Behaviour group to which the congested data flows belong. In order to ensure that the congestion extent notification is returned to the ingress edge node, the core routers in the network may include a signalling channel with dedicated bandwidth for forwarding the congestion message.

In accordance with another aspect of the present invention there is provided a method of reducing congestion in an IP network, comprising:

detecting congestion in a core router in the IP network;

determining a congestion metric for the core router, the congestion metric identifying the extent to which the transmission capacity for the core router is exceeded; and transmitting a congestion metric message from the core router, the congestion metric message including the congestion metric.

Preferably the core router marks the header of data packets passing through that core router with a congestion flag to indicate that such packets have passed through a congested core router.

Thus a congested core router sends a single message downstream towards an egress edge node, containing the congestion metric. It is therefore no longer necessary to insert an ENCODED DSCP into every data packet passing through the congested core router.

Preferably the congestion metric message is a one-hop message and is delivered downstream by the core router through any interfaces through which are sent packets marked with the congestion flag. Any other core routers in the network which receive the congestion metric message may pass the message downstream through any interfaces through which are sent packets marked with the congestion flag.

The other core routers receiving the congestion metric message may preferably forward the message unchanged if they are suffering from less congestion than that indicated by the congestion metric in the message (or no congestion at all). Alternatively, if another core router receives the congestion metric message and suffers from higher congestion than that indicated by the congestion metric, it may replace the congestion metric in the message by its own congestion metric.

The congestion flag is preferably a Differentiated Service Code Point, and may be an AFFECTED DSCP as described above. The congestion metric preferably includes a measure of the maximum bandwidth available to the core router for a Per Hop Behaviour group, and a measure of the bandwidth demanded by flows of that Per Hop Behaviour group arriving at the core router.

Preferably, the congestion metric message is received by an egress edge node of the network and is used by the egress edge node to determine the amount of congestion suffered by core routers forwarding data packets marked with the congested flag. The egress edge node may determine the bandwidth of data flows arriving at the egress edge node having packets marked with the congestion flag, and may determine the aggregate congestion by combining this information with the congestion metric contained in the congestion metric message. This enables the egress edge node to determine a bandwidth that needs to be freed to remove the congestion. This information can then be passed to the ingress edge peer, either on a per-flow basis or, more preferably, on a per-class basis as described above.

Although the congestion metric message may be generated by the core router, in one alternative the congestion metric message is a query message which is initially generated by the ingress edge node. The core router then simply inserts the congestion metric into the query message. The query message may be sent in response to a congestion notification received by the ingress edge node from the egress edge node. The initial congestion notification may be sent by the egress edge node upon receiving marked data packets (i.e. those which have passed through a congested core router). In other words, the congested core router may initially mark data packets passing through with a congestion flag (e.g. AFFECTED DSCP). The egress edge node may receive these marked packets and send a congestion notification to its ingress peer. The ingress node then sends a query message downstream, into which is inserted the congestion metric by the congested core router. This amended query message then becomes the congestion metric message.

Thus, in accordance with a further aspect of the present invention there is provided a method of reducing congestion in an IP network, comprising:

detecting congestion in a core router in the IP network;

marking the header of data packets passing through that core router with a congestion flag to indicate that the marked packets have passed through the congested core router;

forwarding the marked packets to an egress edge node of the network;

identifying at the egress edge node which flows arriving at that node are affected by congestion, on the basis of which packets are marked with the congestion flag;

identifying an ingress edge node of the network responsible for the flows affected by congestion;

sending a congestion notification from the egress edge node to the ingress edge node;

sending a query message downstream from the ingress edge node;

receiving the query message at the congested core router, and inserting into the query message a congestion metric indicating the extent of congestion at the core router; and forwarding the query message downstream to the egress edge node.

The marking of all packets by the congested core node is a simple and fast process. It is also simple and fast for the egress edge node to identify from these packets that congestion is taking place, and which ingress edge node needs to be notified. As with the method previously described, the DSCP count needed for congestion handling is one per PHB.

Preferably the egress edge node determines which data flows arriving at the node are suffering from congestion from the marked data packets, and the extent of congestion from the congestion metric. Preferably the egress edge node notifies the ingress edge node of the extent of congestion. This may be done on a per-flow basis or, more preferably, per-class as described above.

The congestion notification message may be a QoS-NSLP protocol message.

The invention also provides an IP network configured to carry out the methods described above. Egress edge, ingress edge and core routers performing the constituent parts of the methods described above also fall within the scope of the invention. It will be appreciated that the invention applies particularly to IP networks having a Differentiated Services (DiffServ) architecture.

In accordance with another aspect of the present invention there is provided an egress edge node of an IP network, configured to:

identify congested data flows, which have passed through congested core routers within the network, arriving at the edge node;

determine an aggregate congestion represented by the congested data flows; and send a congestion extent notification to an ingress edge node of the network, the congestion extent notification including information regarding the aggregate congestion.

The congestion extent notification preferably includes an indication of a congestion-clearing bandwidth which must be freed to remove the congestion caused by flows passing through the ingress edge node to which the congestion extent notification will be sent. The congestion extent notification preferably identifies a Per Hop Behaviour group to which the congested data flows belong.

Preferably, the egress edge node is configured so that the identification of congested data flows comprises counting data packets arriving at the edge node marked with a congestion flag, and so that the determination of the aggregate congestion includes receiving a congestion metric message from a core router within the network.

In accordance with a further aspect of the present invention there is provided an egress edge node of an IP network, configured to:

identify congested data flows, which have passed through congested core routers within the network, arriving at the edge node;

identify an ingress edge node of the network from which the congested data flows have originated;

send a congestion notification to the ingress edge node, the congestion notification informing the ingress edge node that congestion is present;

receive a query message from the ingress node, into which congested core routers have inserted a congestion metric;

determine an aggregate congestion represented by the congested data flows using the congestion metric; and send a congestion extent notification to the ingress edge node, the congestion extent notification providing information about the congestion.

The congestion extent notification may be sent to the ingress edge node on a per-flow basis or, more preferably, per-class as described above. The congestion notification and query messages may be QoS-NSLP protocol messages.

In accordance with another aspect of the present invention there is provided an ingress edge node of an IP network, configured to:

reserve states in the network;

forward data flows into the network on the basis of the reserved states;

receive a congestion extent notification from an egress edge node of the network, the congestion extent notification including information identifying an extent to which the data flows emanating from the ingress edge node have become congested; and terminate at least some of the data flows on the basis of the information in the congestion extent notification.

The congestion extent notification may include an indication of the bandwidth which must be freed by the ingress edge node to remove congestion, the ingress edge node being configured to terminate sufficient data flows to clear that bandwidth.

In accordance with a yet further aspect of the present invention there is provided an ingress edge node of an IP network, configured to:

reserve states in the network;

forward data flows into the network on the basis of the reserved states;

receive a congestion notification from an egress edge node of the network, the congestion notification indicating that data flows emanating from the ingress edge node have become congested;

send a query message to the egress edge node into which a congestion metric is insertable by core routers in the network;

receive a congestion extent notification from the egress edge node; and terminate at least some of the data flows on the basis of the information in the congestion extent notification.

In accordance with another aspect of the present invention there is provided a core router in an IP network, configured to:

detect congestion;

mark the header of data packets passing through the core router with a congestion flag;

determine a congestion metric identifying the extent to which the transmission capacity for the core router is exceeded; and transmit a congestion metric message including the congestion metric.

The congestion metric message is preferably a one-hop message, the core router being configured to deliver the message downstream through any interfaces through which are sent packets marked with the congestion flag. The congestion flag is preferably a Differentiated Service Code Point (e.g. AFFECTED DSCP). The congestion metric preferably includes a measure of the maximum bandwidth available to the core router for a Per Hop Behaviour group, and a measure of the bandwidth demanded by flows of that Per Hop Behaviour group arriving at the core router. The congestion metric message may be a query message received from an ingress edge node, into which the congestion metric is inserted by the core router.

In accordance with another aspect of the present invention there is provided a core router in an IP network, configured to:

detect congestion at the core router;

mark the header of data packets passing through the core router with a congestion flag if congestion is present;

determine a congestion metric identifying the extent to which the transmission capacity for the core router is exceeded;

receive a congestion metric message, containing a congestion metric, from another core router in the network;

if the congestion at the core router is the same or lower than the congestion metric contained in the received congestion metric message, forward the received congestion metric downstream unchanged; and if the congestion at the core router is higher than the congestion metric contained in the received congestion metric message, replace the congestion metric in the congestion metric message with the congestion metric at the core router and then forward the congestion metric message downstream.

It will be appreciated that the congestion handling methods described above can be applied in a domain which has, speaking in NSIS context, non-NSIS-aware routers. The reason for this is that NSIS protocol messages are sent transparently through the routers which do not support the protocol, using standard IP routing. Furthermore, extending the theory used in the invention can be done without modifications, permitting its usage in multiple environments, not just NSIS.

DETAILED DESCRIPTION OF THE PREFERRED EMBODIMENT

A typical IP DiffServ domain, such as for example the domain 10 illustrated in FIG. 1, comprises ingress edge and egress edge nodes and interior routers. An admission control algorithm, based on resource reservation, is applied to provide QoS for flows admitted under normal operating conditions, as described in the state of the art. In order to handle extreme conditions, such as a large increase of the call rate, or link or node failure, a severe congestion algorithm is used. The ingress edge and egress edge nodes maintain per flow reservation states. The basic mechanism of the severe congestion algorithm is used to terminate some of the flows in order to maintain QoS for the other flows. An optimization of the severe congestion algorithm is described below.

In the case of unexpected conditions, the traffic can be higher than the capacity of the routers or links, as previously described with reference to FIG. 1, showing the failure of one of the links fails in a data path. When the link failure is detected, the routing protocol reroutes the traffic to an alternative data path. In this situation there is no admission control before rerouting, so it is possible that the traffic is higher than the capacity of the router or link in the new path. In this situation the router starts dropping the packets that cannot be handled.

In RMD, the interior routers periodically measure the number of dropped bytes and mark the packets passing the congested router or routers. The number of marked bytes indicates the excess traffic.

The egress edge nodes monitor the packets which pass through them. If the packets are marked so as to indicate congestion, action needs to be taken. Each egress edge node identifies the congested flows, and aggregates the per-flow notifications into one signalling message, per ingress peer, containing the total bandwidth the given ingress peer needs to free from the affected PHB class. The decision of which flows to terminate is then left to the ingress edge node. This is possible because all state information, including flow priorities, are completely shared between ingress-egress peers. This aggregation inherently assumes that, for every flow, a given egress node stores its ingress peer. Since edge nodes are generally stateful routers with considerable memory and processing power, often dedicated to specific tasks, this additional storage and processing requirement is minimal.

This process is suited to the NSIS protocol stack, since this operation is supported by the architecture.

It will also be noted that aggregated signalling messages do not get lost even in congested situations. They are sent using reliable transport methods, such as TCP or STCP, between stateful peers (from egress to ingress nodes), which means that signalling messages are re-sent if acknowledgement is not received by the sender of the signalling message. For additional reliability, a signalling channel with dedicated bandwidth in every router's forward queue can be established if necessary.

Clear advantages of this method are the reduction in the number of signalling messages required, together with the reduction of transport layer processing. The method avoids congestion notification messages putting a burst-like strain on the already congested network. Furthermore, the time needed in ingress nodes to completely eliminate congestion is dramatically reduced. There are fewer API-calls and socket operations by orders of magnitude.

Figure 3:
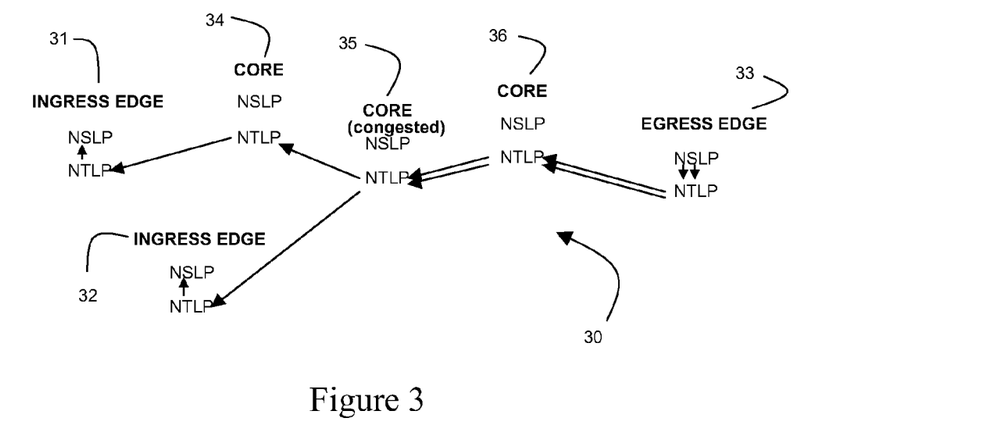
FIG. 3 illustrates aggregate congestion modifications in an IP DiffServ domain.

FIG. 3 illustrates a sample scenario, and shows an IP DiffServ domain 30 having two ingress edge nodes 31, 32, an egress edge node 33 and three core routers 34, 35, 36, where one of the core routers 35 is congested. The NSIS Signalling Layer (NSLP) and NSIS Transport Layer (NTLP) is shown for each node. Even QoS must be deleted for a large number of flows, only one message needs to be sent from the egress edge node 33 to the first ingress edge node 31, and one from the egress edge node to the second ingress edge node. The time saved is thus considerable.

Suppose there are 200 flows from the first ingress edge node 31 and 100 flows from the second ingress node 32. Assuming linear, single-threaded API-calls and session management, the time needed to remove the congestion can be calculated as follows:

Let T be the time needed for a SendMsg( ) and RecvMsg( ) API-call pair, plus the processing time of a Notify message. Testbed results have shown T to be 1.3 ms on average.

Using the known method of per-flow notification:
Sum for all affected I-E pairs [sum for all affected flows [at least T]]
≈1.3 ms×1.5×(200+100)~585 ms By comparison, using aggregating signalling messages:
Sum for all affected I-E pairs [at least T]
≈1.3 ms×1.5~2 ms Thus there is a dramatic reduction in the time required to remove the congestion. It will be notes that, in more complex topologies, with the same or more signalling sessions, the advantages increase accordingly.

Thus the process adopted by an egress edge node when it identifies congestion has been established. The procedure by which the congestion metric is passed to the egress edge nodes will now be described. When a core node detects congestion in one specific interface, it deduces the congestion (overload) metric by any suitable method (e.g. by counting dropped packets, or rate changes). Then it re-marks every packet sent through the congested interface with AFFECTED DSCP, as described above with reference to the known data-packet marking original method.

The core node then generates a one-hop special message, containing the overload metric, and sends it downstream on the congested interface. Since the message is valid for one hop only, the generation of the destination address is straightforward: it can be done by the transport layer, or manual calculation involving the routing table. If the next downstream node is an egress node, then it assumed that the congestion metric and affected flow information has reached the egress node as required. If the next downstream node is another core node, which then receives the special message, one of two events occurs:

if the downstream core node is also congested, with a congestion metric higher than that contained in the special message, it replaces that metric with its own, before proceeding.

if the downstream core node is either not congested, or congested but to a smaller overload metric (bandwidth), it does not alter the metric of the special message received.

The downstream core node then repeats the special message and sends it further downstream through any interface through which it is already sending packets marked with AFFECTED DSCP (excluding the interface on which the special message arrived). This can be implemented with a simple per-interface counter with periodic checks. As an implementation specific parameter, a timer is set up so that, if an interface does send AFFECTED DSCP marked packets within that time frame, special message cloning occurs. This is a minimal storage requirement, required only while the timer counts.

The method ensures that all egress nodes in the domain which are affected by congestions will be informed of the correct congestion metric, and they will be informed at flow-level, since the special messages will only follow the routes used by packets marked with AFFECTED DSCP. Egress nodes which have no flows affected by the congestions will not receive the special message.

The operation model is illustrated in FIG. 3.

The congestion metric sent in the special message includes the following information:

L: the maximum available bandwidth the core router's given interface can handle for the given PHB class without congestion;

C: the total desired bandwidth, which the core would send on its congested interface to meet the demand, if that were possible.

Given these definitions, every congestion situation can be efficiently described. For example, if a core node is configured to allow 50 Mbps traffic for the Expedited Forwarding (EF) PHB, but it would need to send additional 20 Mbps, the metric would be:

L=50; C=70.

If the scheduler at the congested node is configured to allow an extra 10 Mbps EF traffic—by pre-empting the extra bandwidth from the Best Effort (BE) PHB, and thus sending 60 Mbps in reality—this would still not mean a problem for core nodes that are located further downstream on the signalling path, since they measure their incoming traffic. By this measurement, they are able to determine their current overload correctly.

The operation is described below in detail. After the congestion is detected at a given core node, it constructs the previously described special message, containing the L and C values. This message is stored, cloned, and re-sent by other downstream core nodes until it reaches all egress nodes that receive AFFECTED marked data-packets.

Thus every egress node affected by the congestion is notified of the congestion situation, and checks its filters to get a list of the affected flows. This check can be very fast, since no time-consuming measurements are required in egress, just per-flow AFFECTED marked packet counters. If a counter has changed, the given flow received at least one AFFECTED marked packet, and is thus is involved in the given congestion. Then the egress node derives the final bandwidth value which must terminate from the congested PHB class. It does so by multiplying all the sum bandwidth of its affected flows by (C−L)/C. A signal is then sent to the ingress peer, using either the traditional per-flow or the new aggregated method described above.

The example discussed above (L=50, C=70) can be used to illustrate this. If three affected egress nodes receive AFFECTED marked packets for their flows of 15 Mbps, 25 Mbps, and 30 Mbps, they need to terminate $20/70$ of them, to solve the congestion. Thus, for example, the first egress has to signal to ingress for the termination of 2/7*15~4.285 Mbps.

This invention is faster and less demanding in terms of DSCP count than the system of marking the congestion metric into all packets affected by the congestion. Although data-marking of affected packets is still employed to convey the per-flow congestion information, it is no longer necessary to provide an additional ENCODED DSCP in each packet to convey the overload metric. This requirement is, instead, met by the special messages which follow the same route as the affected packets.

Figure 4:
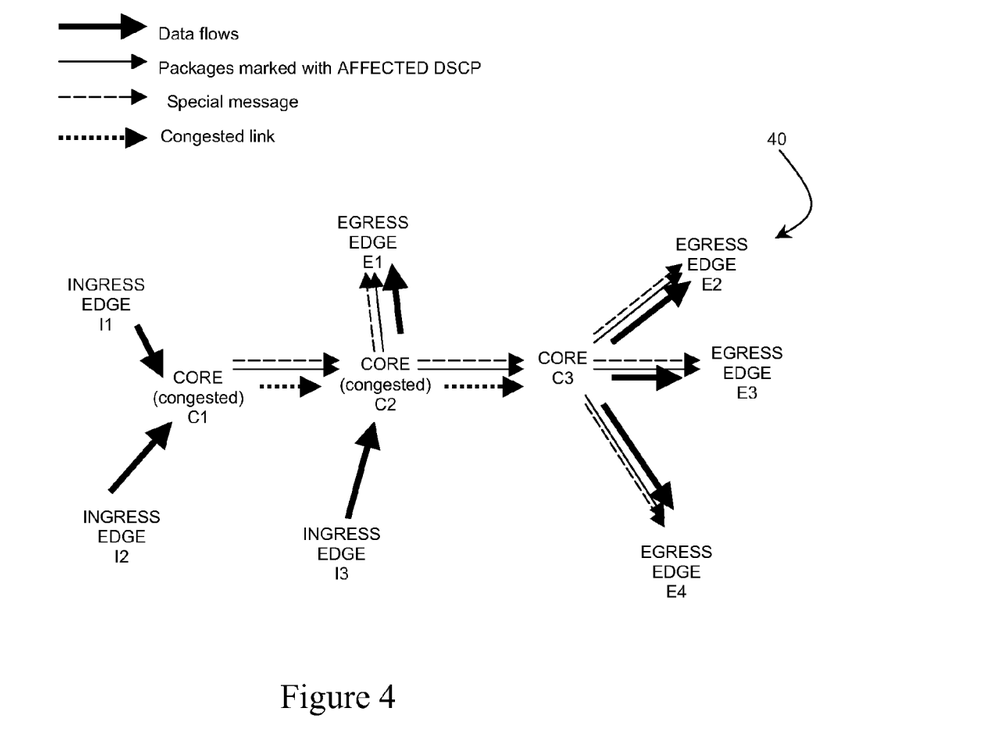
FIG. 4 illustrates the transmission of a congestion metric and affected flow information in an IP DiffServ domain.

This is illustrated with reference to FIG. 4, which shows an IP DiffServ domain 40 having three ingress edge nodes I1, I2, I3, three core routers C1, C2, C3 and four egress edge nodes E1, E2, E3, E4. The downstream interfaces of the core routers C1, C2 are congested. From the figure it can be seen that the special message will follow the same routes as packets marked with the AFFECTED DSCP and will eventually emerge at the same egress nodes.

A further variation uses a two-stage mechanism instead of generating messages and cloning them in the core nodes. The first step of the two-step mechanism involves informing all affected egress nodes of the congestion using the per-PHB AFFECTED-DSCP marking described above. When egress nodes receive the marked packets, they determine which of their flows, and consequently which of their ingress peers, are affected by the congestion. They then send specific "notify" messages upstream to these ingress peers, indicating the congestion situation.

The ingress peers then send specific "query" messages downstream, into which the congested core nodes write their congestion metric. As long as no packet forwarding paths change during the congestion handling, all egress nodes will finally receive the correct congestion metric. The query message is sent in response to the notify message. If the query message does not arrive, the egress edge node resends the notify message. A further protection is that the query message usually generates a response message in the egress edge node. If this response does not arrive back at the ingress edge node, the query is resent.

In the case of NSIS the Notify and Query messages are QoS-NSLP protocol messages. The Notify messages are sent in a reliable way from egress and ingress. The NSIS transport layer ensures that this message arrives to the ingress using reliable transport protocols (e.g. TCP, STCP). The QoS-NSLP Notify message, sent from egress to ingress, includes an error code indicating the congestion. As a response the ingress edge node sends a Reserve(Query) message. The Reserve(Query) includes a QoS Specification object that collects the overload in the data path. The Reserve(Query) is sent by datagram mode (by using UDP protocol) following the data path. Therefore, the Query passes the same routers as data and able to collect the congestion metric. The egress edge node then sends per flow or aggregated termination messages to the ingress edge node for the flows that have to be terminated. Alternatively, the egress edge node sends a Response message to the ingress edge node, indicating the overload in the routes culminating at that egress edge node. If this is the case, the ingress edge node chooses which flows to terminate.

The methods described above enable less demanding and faster intra-domain congestion handling and QoS recovery in reduced-state reservation protocols. In particular, aggregate congestion notifications allow for a shorter solution time, with minimised signalling needs, without message bursts. Methods based on special messages (whether core-generated or notify-query) reduce the DSCP count needed for congestion handling, since only one extra DSCP is required for each PHB. This saves at least 5 DSCPs. Furthermore, no per-flow marked packet measurement is needed in egress nodes, just a simple per-flow flag for identifying the AFFECTED DSCP. Since the overload metric is encoded in a special message, there is no limitation on, or granularity problems with, the congestion metric. When compared to standard refresh-based congestion handling, the methods described above have a solution time which is orders of magnitude shorter. Further more, the solution is reliable and constant, and does not depend on the per-link flow-count.

It will be appreciated that variations from the above described embodiments may fall within the scope of the invention.

The invention claimed is:

1. A method of reducing congestion in an IP network, comprising:
    detecting congestion in a core router in the IP network;
    determining a congestion metric for the core router, the congestion metric identifying the extent to which the transmission capacity for the core router is exceeded; and
  transmitting a congestion metric message from the core router, the congestion metric message including the congestion metric, to a downstream core router, wherein
    if the downstream core router receiving the congestion metric message suffers less congestion than indicated by the congestion metric, forwarding the message unchanged and
    if the downstream core router receiving the congestion metric message has higher congestion than the congestion metric, the downstream core router replaces the congestion metric with the downstream core router's own congestion metric.

2. The method of claim 1, wherein the core router marks the header of data packets passing through the core router with a congestion flag to indicate that such packets have passed through a congested core router.

3. The method of claim 2, wherein the congestion metric message is a one-hop message and is delivered downstream by the core router through any interfaces through which are sent packets marked with the congestion flag.

4. The method of claim 3, wherein any other core routers in the network which receive the congestion metric message pass the message downstream through any interfaces through which are sent packets marked with the congestion flag.

5. The method of claim 2, wherein the congestion flag is a Differentiated Service Code Point.

6. The method of claim 2, wherein the congestion metric includes a measure of the maximum bandwidth available to the core router for a Per Hop Behaviour group, and a measure of the bandwidth demanded by flows of that Per Hop Behaviour group arriving at the core router.

7. The method of claim 2 wherein the congestion metric message is received by an egress edge node of the network and is used by the egress edge node to determine the amount of congestion suffered by core routers forwarding data packets marked with the congested flag.

8. The method of claim 7, wherein the egress edge node determines:
    the bandwidth of data flows arriving at the egress edge node having packets marked with the congestion flag; and
    an aggregated congestion by combining this information with the congestion metric contained in the congestion metric message.

9. The method of claim 8, wherein the egress edge node determines a bandwidth that needs to be freed to remove the congestion.

10. The method of claim 9, wherein the egress edge node notifies an ingress edge node of the network of the bandwidth which needs to be freed to remove the congestion.

11. The method of claim 2, wherein the congestion notification and query message are QoS-NSLP protocol messages.

12. A core router in an IP network, comprising:
    a detector in an edge node for detecting congestion;
    the core router
      marking the header of data packets passing through the core router with a congestion flag;
    determining a congestion metric identifying the extent to which the transmission capacity for the core router is exceeded; and
    transmitting a congestion metric message including the congestion metric to a downstream core router, wherein
      if the downstream core router receiving the congestion metric message suffers less congestion than indicated by the congestion metric, forwarding the message unchanged; and
      if the downstream core router receiving the congestion metric message has higher congestion than the congestion metric, the downstream core router replaces the congestion metric with the downstream core routers own congestion metric.

13. The core router of claim 12, wherein the congestion metric message is a one-hop message, the core router being configured to deliver the message downstream through any interfaces through which are sent packets marked with the congestion flag.

14. The core router of claim 12, wherein the congestion flag is a Differentiated Service Code Point.

15. The core router of claim 12, wherein the congestion metric includes a measure of the maximum bandwidth available to the core router for a Per Hop Behaviour group, and a measure of the bandwidth demanded by flows of that Per Hop Behaviour group arriving at the core router.

16. The core router of claim 12, wherein the congestion metric message is a query message received from an ingress edge node, into which the congestion metric is inserted by the core router.

* * * * *

UNITED STATES PATENT AND TRADEMARK OFFICE
CERTIFICATE OF CORRECTION

| | | |
|---|---|---|
| PATENT NO. | : 8,009,568 B2 | |
| APPLICATION NO. | : 12/514016 | |
| DATED | : August 30, 2011 | |
| INVENTOR(S) | : Pinter et al. | |

It is certified that error appears in the above-identified patent and that said Letters Patent is hereby corrected as shown below:

In Column 14, Lines 31-32, in Claim 12, delete "routers" and insert -- router's --, therefor.

Signed and Sealed this
Third Day of January, 2012

David J. Kappos
*Director of the United States Patent and Trademark Office*